(12) United States Patent
Munro

(10) Patent No.: US 8,467,129 B2
(45) Date of Patent: Jun. 18, 2013

(54) VEILING GLARE REDUCTION SYSTEM AND METHOD OF CONTROLLING REFLECTION FROM A VEHICLE WINDSHIELD

(75) Inventor: Calum H. Munro, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 538 days.

(21) Appl. No.: 12/116,981

(22) Filed: May 8, 2008

(65) Prior Publication Data

US 2009/0097125 A1   Apr. 16, 2009

Related U.S. Application Data

(60) Provisional application No. 60/932,436, filed on May 31, 2007.

(51) Int. Cl.
G02B 27/28 (2006.01)

(52) U.S. Cl.
USPC .... 359/488.01; 359/601; 359/613; 296/96.19

(58) Field of Classification Search
USPC ... 359/493, 601, 613, 614, 488.01; 296/96.19
See application file for complete search history.

(56) References Cited

U.S. PATENT DOCUMENTS

| | | | | |
|---|---|---|---|---|
| 3,868,293 A | * | 2/1975 | Selph | 428/40.1 |
| 5,005,010 A | | 4/1991 | Misaki | |
| 5,053,755 A | * | 10/1991 | Smith et al. | 345/7 |
| 5,161,879 A | * | 11/1992 | McDermott | 362/206 |
| 5,335,099 A | | 8/1994 | Smith | |
| 5,502,456 A | * | 3/1996 | Korenaga et al. | 345/9 |
| 6,217,176 B1 | | 4/2001 | Maekawa | |
| 6,299,231 B1 | * | 10/2001 | Reitz | 296/97.7 |
| 6,746,126 B2 | * | 6/2004 | Scherber et al. | 359/613 |
| 7,011,355 B1 | | 3/2006 | Su | |
| 7,097,303 B2 | | 8/2006 | Kumar | |
| 8,143,563 B2 | * | 3/2012 | Broude et al. | 250/203.4 |
| 2002/0109919 A1 | * | 8/2002 | Scherber et al. | 359/601 |
| 2002/0171256 A1 | * | 11/2002 | Ward | 296/97.7 |
| 2003/0048194 A1 | * | 3/2003 | Wada | 340/815.4 |
| 2005/0012682 A1 | * | 1/2005 | Jenson et al. | 345/7 |
| 2007/0216836 A1 | * | 9/2007 | Lippey | 349/117 |
| 2007/0217010 A1 | * | 9/2007 | Lippey | 359/493 |
| 2011/0209319 A1 | * | 9/2011 | Williams | 29/402.01 |

FOREIGN PATENT DOCUMENTS

| | | | |
|---|---|---|---|
| JP | 2004130916 | | 4/2004 |
| JP | 2004130916 A | * | 4/2004 |
| JP | 2006056413 | | 3/2006 |

\* cited by examiner

Primary Examiner — Frank Font
(74) Attorney, Agent, or Firm — Julie W. Meder

(57) ABSTRACT

A vehicle glare reduction system is provided, which improves the visual acuity of the vehicle operator in vehicles having a light-colored dashboard. The system includes a dashboard having an upper surface from which dashboard light is reflected; a windshield having an inner and outer surface, the windshield surface configured to reflect the dashboard reflected light; and a polarization layer disposed on the dashboard upper surface, adapted to polarize the dashboard reflected light, wherein the polarized light is not reflected by the windshield inner surface.

15 Claims, 2 Drawing Sheets

VEILING GLARE REDUCTION SYSTEM AND METHOD OF CONTROLLING REFLECTION FROM A VEHICLE WINDSHIELD

CROSS REFERENCE TO RELATED APPLICATION

This application claims the benefit of U.S. Provisional Patent Application No. 60/932,436, filed May 31, 2007, entitled "Method of Controlling Reflection From a Vehicle Windshield", incorporated herein by reference.

FIELD OF THE INVENTION

The present invention relates to vehicle veiling glare reduction systems, and more specifically to a vehicle veiling glare reduction system incorporating a single polarizing layer.

BACKGROUND OF THE INVENTION

Light reflected from a dashboard that reflects off a windshield can interfere with a driver's vision. Referring to FIG. 1, veiling glare in a windshield of a vehicle V occurs when ambient light passes through the windshield W, reflects off the upper surface of dashboard D, back onto the windshield W and reflects off the windshield W (shown in broken line) into the driver's eyes. The driver sees a virtual image of the lit dashboard D beyond the windshield W that "veils" or impedes the ability to discern the scene ahead of the vehicle. Veiling glare is exacerbated by windshields having a steep slope (such as in cab forward designs) and light-colored or glossy finished dashboards.

In order to compensate for veiling glare, vehicle manufacturers have been forced to limit the degree of windshield slope, as well as to use dark colors and/or a textured surface on the dashboard. These features limit the options for design of vehicles, and the dark colored dashboards absorb radiation resulting in increased heat within the vehicle. Other systems for reducing veiling glare have focused on the windshield, such as by placing holographic material on the windshield, which is complicated and expensive to manufacture. More recently, veiling glare has been reduced using light polarizing systems.

In one such system, as described in U.S. Pat. No. 6,299,131, a first polarization layer is placed on the interior or exterior surface of the windshield, and a second polarization layer is placed on the dashboard upper surface. The windshield polarization layer and the dashboard polarization layer polarize light in different directions from each other. The described use of a polarizing layer on the surface of the windshield to polarize light transmitted through the windshield in a first predetermined direction is undesirable, as the effective polarization of visible light reduces the transmission of light through the windshield to approximately one-half the original transmission level. This significant attenuation of light transmission can impair the visual ability of a vehicle operator during low light conditions such as at night. Legislation dictates the minimum level of transmission for driver safety. For example, in the United States, the Federal Department of Transportation specifies a minimum of 70% visible light transmission (VLT) for window tinting on the windshield and the windows to the immediate left and right of the driver. Automobile manufacturers and distributors operating in the United States are required by federal law to provide glass with a minimum of 70% visible light transmission. The attenuation of approximately 50% of the original visible light transmission by the described polarization layer on the windshield would not meet the federal requirements.

SUMMARY OF THE INVENTION

The present invention includes a veiling glare reduction system, for a vehicle having a windshield and an interior surface comprising: a windshield without a polarizer, the windshield having an inner surface and an outer surface and allowing light to pass therethrough; a vehicle interior surface that reflects the light passing through the windshield; and a polarization layer disposed on the vehicle interior surface and adapted to polarize the light reflected by the vehicle interior surface, such that the vehicle interior reflected light is polarized and is not reflected by the windshield inner surface.

The present invention also includes a method of reducing veiling glare in a vehicle having a windshield and a vehicle interior surface comprising: passing light through the windshield; allowing the light passing through the windshield to strike the vehicle interior surface and be reflected by the interior surface; and polarizing the light reflected by the interior surface by providing a polarization layer on the vehicle interior surface, such that the light reflected from the vehicle interior surface is polarized in a direction that is not reflected by the windshield inner surface.

DETAILED DESCRIPTION OF THE INVENTION

Figure 1:
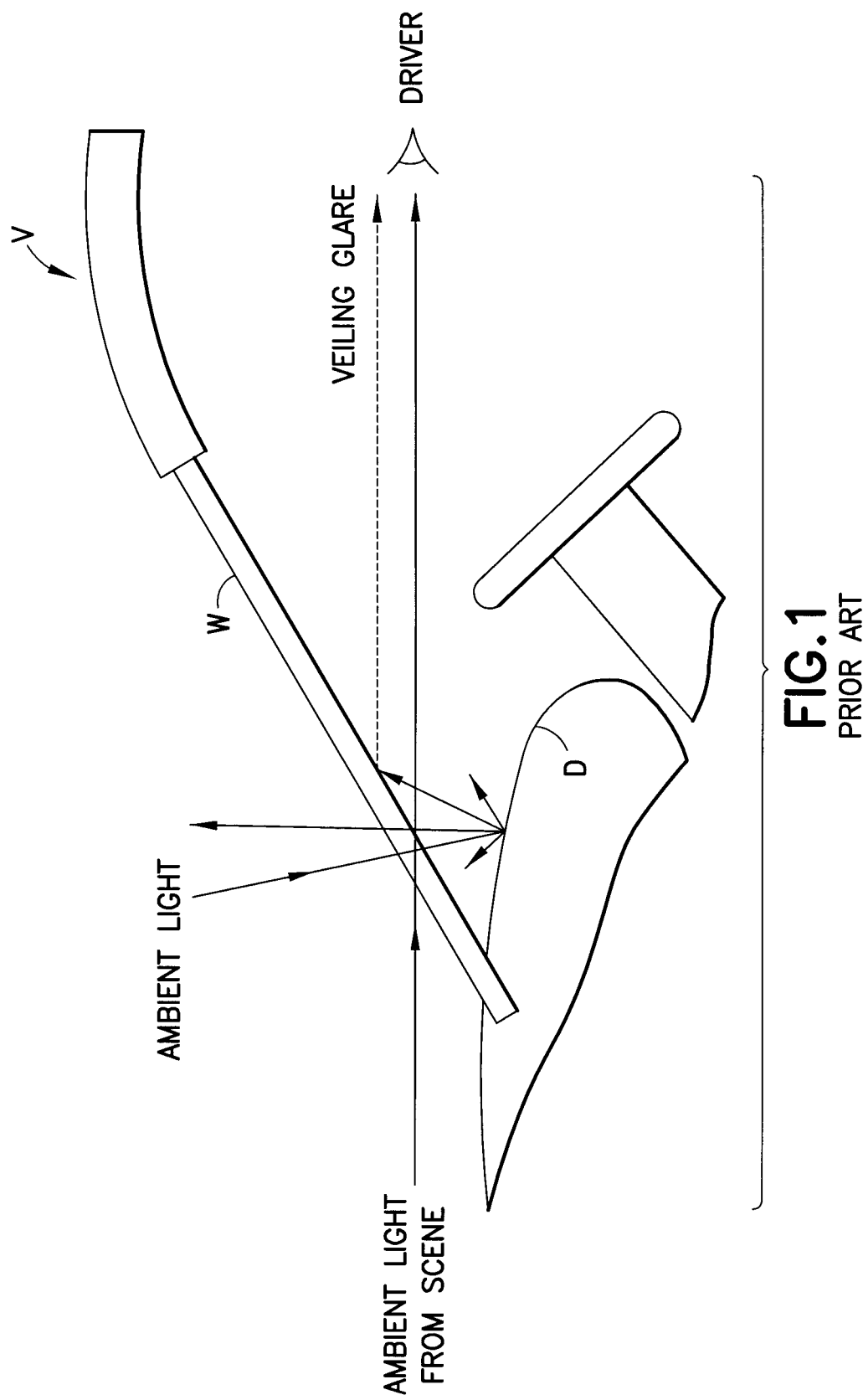
FIG. 1 is a schematic cross-sectional view of a portion of a vehicle of the prior art.
Figure 2:
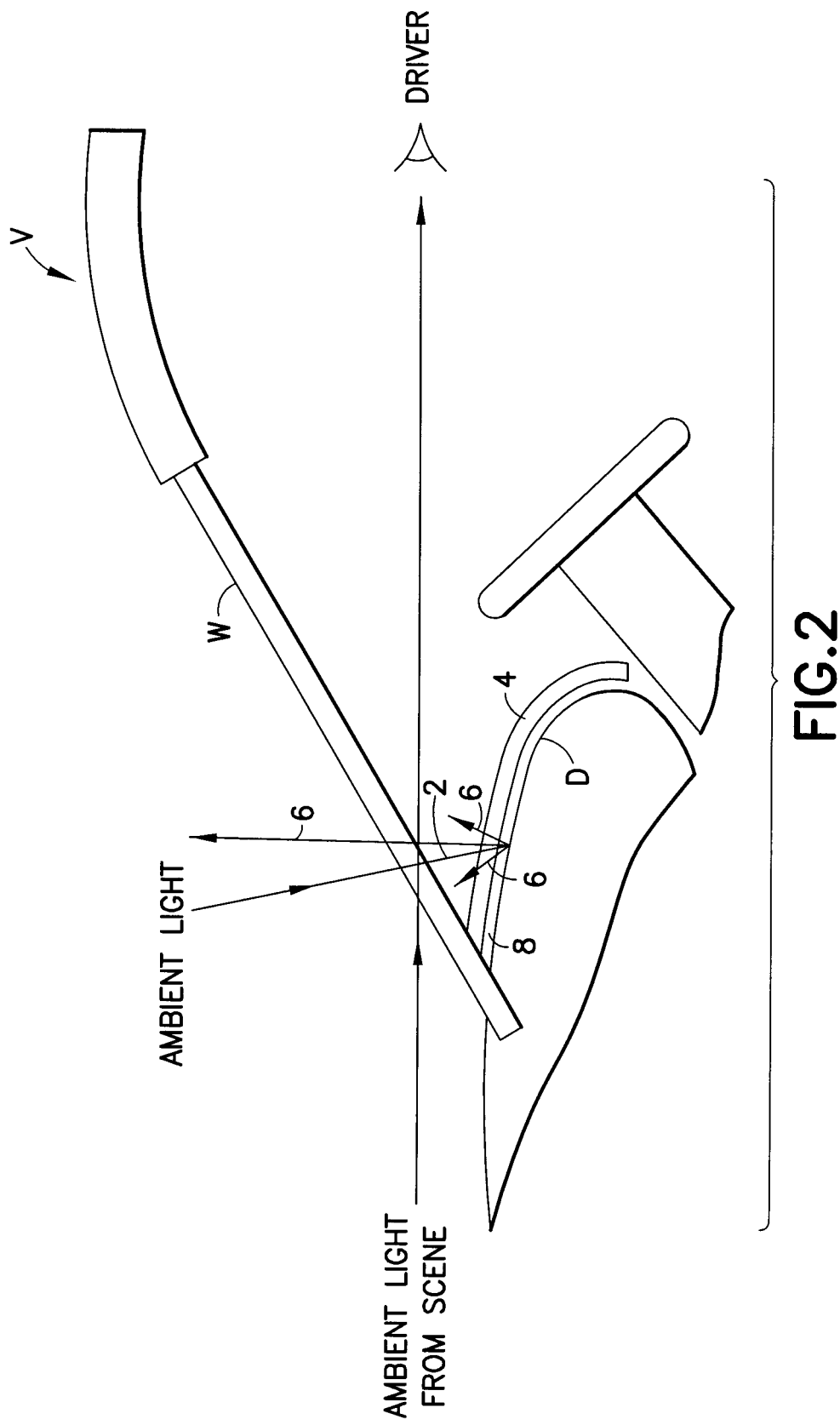
FIG. 2 is a schematic cross-sectional view of a portion of a vehicle having the veiling glare reduction system of the present invention.

Referring to FIG. 2, the present invention is directed to a veiling glare reduction system for use in a vehicle V. By vehicle, it is meant a passenger vehicle, truck, train, airplane, watercraft or the like, having a sloped windshield and a dashboard. The windshield W of a conventional vehicle V is typically produced from glass or plastic.

Light incident on the windshield W will be transmitted or absorbed or reflected, depending on the properties of the windshield W, such as the refractive index of the windshield material and the chemical composition of the windshield W, as well as the angle of incidence of the light. Light incident normal to the windshield W surface will typically not be polarized, unless the windshield W additionally includes a polarizing element. However, light incident at certain angles away from normal will be partially polarized by reflection. When light reflects from an interface between two transparent materials (e.g., at the air-glass interface) at an angle, the reflectivity is different for light polarized in the plane of incidence (p-polarized) and light polarized perpendicular to it (s-polarized). At one particular angle of incidence known as Brewster's angle (named for a Scottish physicist Sir David Brewster, also referred to as the polarization angle or $\theta_B$), p-polarized light is transmitted and the reflected light is s-polarized. When non-polarized light strikes a surface at Brewster's angle, the reflected light is always s-polarized. At angles near to Brewster's angle, this polarization phenomenon still occurs, but is reduced.

Thus, ambient light from outside the vehicle V passes through the windshield W and is substantially non-polarized, except for the light waves incident at and near Brewster's angle. Those light waves 2 are polarized by reflection at the air-glass interface.

The p-polarized light 2 passing through the windshield W strikes a polarization layer 4 positioned on an interior surface of the vehicle, such as the dashboard D. The light 6 reflected by the dashboard D is linearly polarized in a predetermined direction. This is accomplished by orienting the polarization layer 4 in a given position relative to the position of the windshield W, such that the plane polarized light 6 reflected by the dashboard D is polarized in the plane of incidence with the windshield W (p-polarized). The p-polarized light 6 that is incident on the inner surface of the windshield W passes back through the windshield W without reflection at the inner surface of the windshield W.

The present invention takes advantage of the inherent polarizing effect of a windshield W on light incident on the windshield W near Brewster's angle. Thus, unlike in prior veiling glare reduction systems, no additional polarizing member is used in conjunction with the windshield W. In the present invention, reference to radiation not being reflected by the windshield W means that an insubstantial or minimal amount of radiation is reflected by the windshield W, as the polarization of the light reflected by the dashboard D may be incomplete, or the angle of incidence of the reflected polarized light 6 may not exactly match Brewster's angle.

In one embodiment, a reflective layer 8 is sandwiched between the dashboard D and the polarization layer 4. The reflective layer 8 may be a coating composition containing scattering pigments (e.g., $TiO_2$) or reflective pigments (e.g., metallic flake). The dashboard D is colored and absorbs light accordingly. However, non-absorbed radiation, including visible light, infrared and near-infrared radiation may be reflected by the reflective layer 8.

The polarization layer 4 may be a conventional absorbing polarizing filter, such as a sheet or layer of polymeric film that has been stretched or otherwise oriented and impregnated with an iodine chromophore or dichroic dye. Such conventional polarizing filters may be prepared by heating a sheet or layer of polyvinyl alcohol (PVA) to soften the PVA and then stretch the sheet to orient the PVA polymer chains. Thereafter, an iodine chromophore or dichroic dye is impregnated into the sheet, such that the iodine or dye molecules attach to the aligned polymer chains and take on the alignment of the aligned polymer chain. Alternatively, the iodine chromophore or the dichroic dye can first be impregnated into the PVA sheet, and, thereafter, the sheet can be sheeted and stretched to orient the PVA polymer chains and associated iodine chromophore or dichroic dye. The choice of chromophore(s) will determine the efficiency of the polarization across optical wavelengths, and the observed color of the system. This is meant to be one example of producing a polarization layer in the present invention, which is not limited thereby.

In another embodiment, an absorbing layer is sandwiched between the dashboard D and the polarization layer 4, in place of the reflecting layer 8. The absorbing layer may be a coating composition containing absorbing pigments (e.g., carbon black). In this arrangement, the polarization layer 4 may be a conventional reflecting polarizing filter, which reflects one polarization of light and transmits the other. The transmitted portion is absorbed by the absorbing layer sandwiched between the dashboard D and the polarization layer 4. This is meant to be one example of producing a polarization layer in the present invention, which is not limited thereby.

There are several benefits of the veiling glare reduction system of the present invention. The system provides improved visual acuity by avoiding or minimizing veiling glare, and it may be used with dashboards that are lighter colored than previously available, such as having a light grey or beige color. In addition, radiation that would ordinarily be absorbed by a dark-colored dashboard is reflected by the system of the present invention. This minimizes the buildup of heat from solar radiation passing through a windshield. The interior of a vehicle having the veiling glare reduction system of the present invention remains cooler on sunny days. In addition, organic constituents present in conventional dashboards are less likely to be volatilized from the dashboard (and collect as a film on the windshield) since the temperature of the dashboard is minimized. This improves the long-term performance of the dashboard and reduces the undesirable build-up of volatilized organic constituents as an oily film on the interior surface of the windshield.

While the preferred embodiments of the present invention are described above, obvious modifications and alterations of the present invention may be made without departing from the spirit and scope of the present invention. The scope of the present invention is defined by the appended claims and equivalents thereto.

What is claimed is:

1. A veiling glare reduction system for a vehicle having a windshield and an interior surface comprising:
    a windshield without a polarizer, the windshield having an inner surface and an outer surface and allowing light to pass therethrough;
    a vehicle interior surface, that is part of the vehicle, that reflects the light passing through the windshield;
    a polarization layer disposed on the vehicle interior surface and adapted to polarize the light reflected by the vehicle interior surface, such that the vehicle interior reflected light is polarized, wherein the polarized light is not reflected by the windshield inner surface, and
    a reflecting layer directly on the vehicle interior surface, wherein the reflection layer comprises a pigmented coating composition,
    wherein the reflection layer comprises a reflective pigment or a scattering pigment or both.

2. The veiling glare reduction system as in claim 1, wherein the reflection layer is sandwiched between the polarization layer and the vehicle interior surface.

3. The veiling glare reduction system as in claim 1, wherein the reflection layer comprises metallic flake pigments or $TiO_2$ or both.

4. The veiling glare reduction system as in claim 1, further comprising a light absorbing layer directly disposed on the vehicle interior surface.

5. The veiling glare reduction system as in claim 4, wherein said light absorbing layer comprises a coating composition with absorbing pigments.

6. The veiling glare reduction system as in claim 1, wherein said vehicle interior surface comprises a dashboard surface.

7. A method of reducing veiling glare in a vehicle having a windshield and a vehicle interior surface comprising:
    passing light through the windshield;
    allowing the light passing through the windshield to strike the vehicle interior surface and be reflected by the interior surface;
    polarizing the light reflected by the interior surface by providing a polarization layer disposed on the vehicle interior surface, such that the polarized light reflected from the vehicle interior surface is polarized in a direction that is not reflected by the windshield inner surface, and providing a reflecting layer directly on the vehicle interior surface, wherein the reflection layer comprises a pigmented coating composition, wherein the reflection layer comprises a reflective pigment or a scattering pigment or both.

8. The method of claim 7, wherein the reflection layer is sandwiched between the polarization layer and the vehicle interior surface.

9. The method of claim 7, wherein the reflection layer comprises metallic flake pigments or $TiO_2$ or both.

10. The method of claim 7, further including providing a light absorbing layer directly on the vehicle interior surface.

11. The method of claim 10, wherein the light absorbing layer comprises a coating composition with absorbing pigments.

12. The method of claim 7, wherein the interior surface comprises a dashboard surface.

13. A vehicle having a vehicle glare reduction system as in claim 1.

14. The veiling glare reduction system as in claim 1, wherein the reflection layer comprises metallic flake pigments.

15. The method of claim 1, wherein the reflection layer comprises metallic flake pigments.

* * * * *